United States Patent [19]

Rimbaud et al.

[11] Patent Number: 5,426,961
[45] Date of Patent: Jun. 27, 1995

[54] ANTITHEFT SECURITY DEVICE FOR TRAILERS OF TRUCKS

[76] Inventors: Pierre Rimbaud, 40 avenue David Dellepiane, Marseilles 13007, France; Paul Rimbaud, lotissement Les Lavandes, avenue du General de Gaulle, Pertuis 84120, France; Joseph Agius, 1 Bd. de la Federation, Marseilles 13004, France; Leopold Sassi, 9 avenue de Saint-Jean, Marseilles 13002, France; Patrick Vignapiano, 16 rue de Smyrne, Marseilles 13005, France

[21] Appl. No.: 30,171
[22] PCT Filed: Sep. 27, 1991
[86] PCT No.: PCT/FR91/00749
§ 371 Date: Mar. 19, 1993
§ 102(e) Date: Mar. 19, 1993
[87] PCT Pub. No.: WO92/05981
PCT Pub. Date: Apr. 16, 1992

[30] Foreign Application Priority Data

Sep. 27, 1990 [FR] France ............... 90 12145
May 10, 1991 [FR] France ............... 91 05977

[51] Int. Cl.⁶ ........................... B60R 25/00
[52] U.S. Cl. ...................... 70/237; 280/763.1; 70/258; 70/190; 70/218
[58] Field of Search ............. 70/237, 235, 190, 174, 70/188, 189, 218, 220, 231, 258; 280/762, 763.1; 248/354.1, 352

[56] References Cited

U.S. PATENT DOCUMENTS 1,358,681  11/1920  Parker ................... 70/188
1,487,863   3/1924  Lavigne ................. 70/189
1,593,144   7/1926  Smith et al. ............ 70/190
2,915,913  12/1959  Molyneux ............... 70/174
3,874,696   4/1975  Gardner et al. ......... 248/188.6
3,892,141   7/1975  Phillips et al. .
4,124,225  11/1978  Lozada et al. .......... 280/763.1
4,281,852   8/1981  Konkle .
4,730,468   3/1988  Becker .
4,903,977   2/1990  Baxter ................. 280/763.1

FOREIGN PATENT DOCUMENTS 0102339  3/1984  European Pat. Off. .
2605569  4/1988  France .
2155873  5/1973  Germany .
 306802  6/1929  United Kingdom ........ 70/190
1565542  4/1980  United Kingdom .

Primary Examiner—Peter M. Cuomo
Assistant Examiner—Darnell M. Boucher
Attorney, Agent, or Firm—Sandler, Greenblum & Bernstein

[57] ABSTRACT

Anti-theft security device for trailers of trucks is provided with a security lock integrated to a mechanism actuating the props of trailers. The anti-security device acts either mechanically on the lifting-lowering motion transmission mechanism while preventing the gears from meshing or by clocking the bevel gear by means of a metal part fitting between two teeth, or by impeding the rotation of the rotary drive bar connecting the two props. The device can also act electrically by cutting the supply of an electric motor supplied by the tractor battery and actuating the props. The mechanical and electrical locks can be combined. The device is particularly applicable to the field of road trucks of large loading capacity which are comprised of a tractor part and a trailer part articulated to each other and which may be detached, and is intended to prevent the theft of the trailer when it is not running and uncoupled.

20 Claims, 3 Drawing Sheets

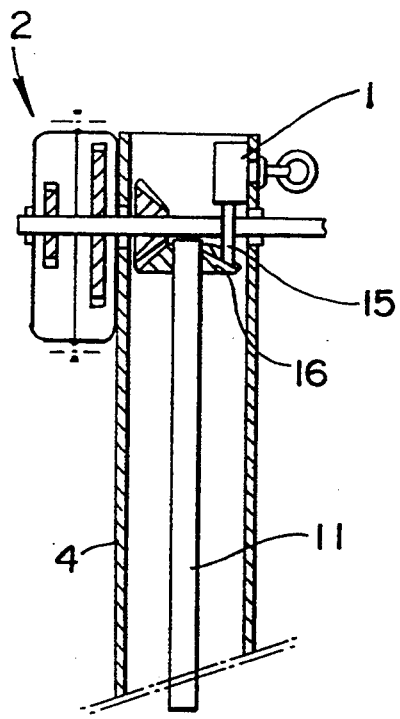
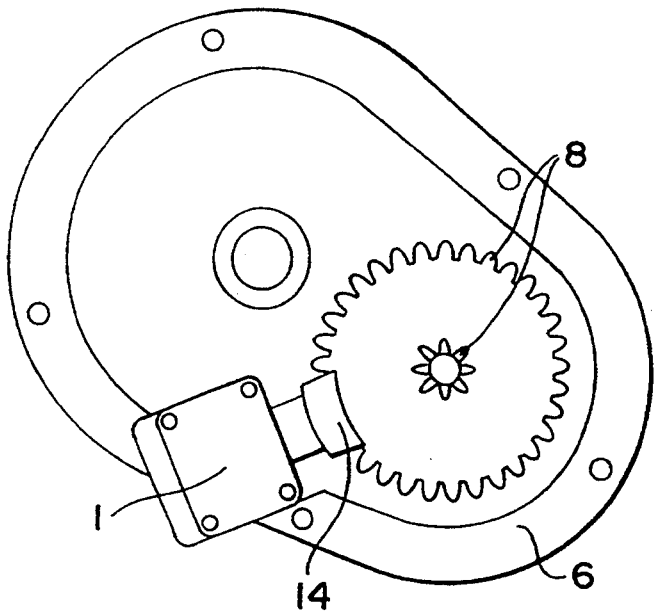
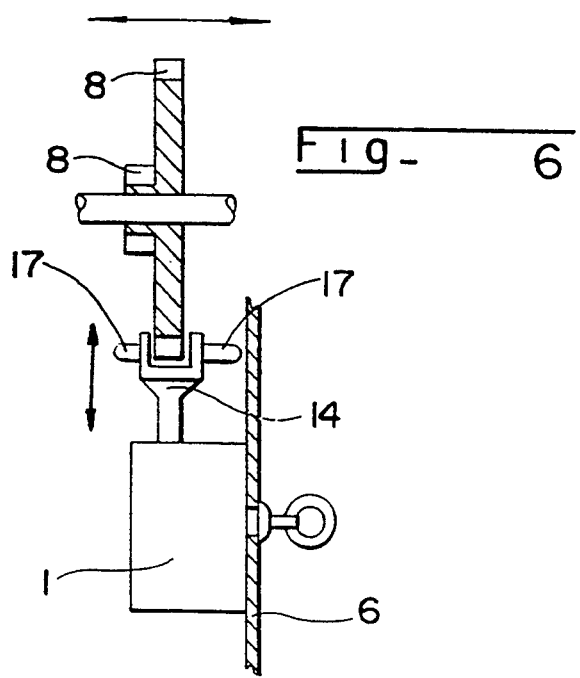

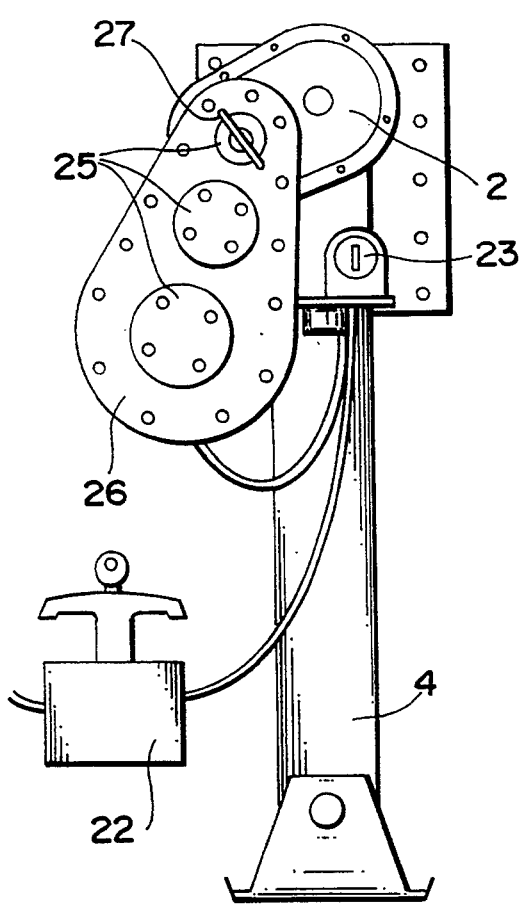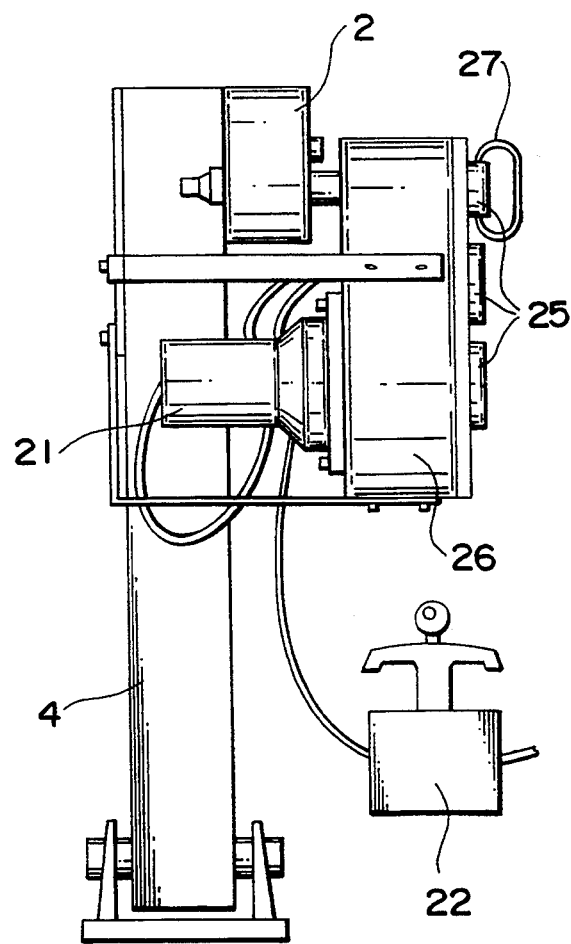

ANTITHEFT SECURITY DEVICE FOR TRAILERS OF TRUCKS

BACKGROUND OF THE INVENTION

1. Field of the Invention

The present invention is related to an anti-theft security device for trailers of trucks.

It is related to the field of high tonnage road transportation undertaken by articulated heavy weight vehicles of the semi-trailer type constituted by a road tractor and a trailer capable of being detached, and its object is to prevent the theft of such trailer when it is immobilized and uncoupled.

2. Discussion of Background Information

Semi-trailers are constituted by a road tractor and a trailer equipped with a standardized coupling system, which enables any type of trailer to be attached to any tractor. Loads of all types are transported by such vehicles, and it is not rare for these loads to represent a substantial amount of money, which naturally attracts thieves.

During transport, the trailers with their load are often detached, for example, while being grouped or degrouped, and left waiting, to enable the tractor to be attached to other trailers so as to use the equipment profitably, with the equipment being specifically designed to enable such type of operations. To this end, the front of the trailer, which is deprived of wheels and rests during transport on a platform of the tractor, is equipped with two telescopic props maneuvered by means of a simple removable crank.

Currently used props are almost all of the same model, each of them being constituted by two cross-sectional tubes sliding in one another, the lower tube bearing an articulated sole resting on the ground and being actuated by an internal screw acting on a nut affixed to such tube. The screw is driven, via a bevel gear, by virtue of a double set of serrated wheels, one of which, actuated by the removable crank, is axially mobile so as to enable actuation of two different gear reductions. These serrated wheels are housed in a case affixed to one of the props, the second only comprising a bevel gear driven by a rotary bar connecting the two props.

In order to steal the trailer and its load, one need only have a standard type of tractor and a crank to actuate the props, since the latter must be raised to enable their displacement.

For some time, thefts of trailers have increased, and up until now, no satisfactory means have been found enabling such actions to be countered, except for the use of security guards, which results in both substantial and repetitive expenditure.

GB-A-1,565,542 describes a device adapted to be mounted on the existing props of semi-trailers, and includes a simple key lock acting on a rod which gets engaged in a gear of the prop maneuvering mechanism. This type of system is generally fairly easy to break into.

EP-A-0,102,339 describes an anti-theft device for automobile trailers based on the use of articulated props actuated by an electric motor controlled by a key interrupter. Such as described, this apparatus is not applicable to semi-trailers of trucks.

SUMMARY OF THE INVENTION

The device according to the present invention provides a solution to these problems. Indeed, for a reasonable investment, it prevents the displacement of the trailer by persons without the requisite key for maneuvering the props.

The device of the present invention is constituted by a security lock integrated into the mechanism actuating the props, and acting either mechanically, or electrically. More specifically, the security lock acts mechanically by preventing the axially mobile serrated wheels from meshing on the corresponding gears, or by blocking the bevel gear by a metallic element which gets inserted between two serrations, or even by preventing the rotation of the rotary drive bar connecting the two props. The security lock acts electrically by cutting off the power of an electric motor powered by the battery of the tractor and actuating the props. The mechanical and electrical locks are combinable.

BRIEF DESCRIPTION OF THE DRAWINGS

In the annexed drawings, provided as non-limiting examples of the embodiments of the object of the invention:

FIG. 4 is a vertical section, at a different scale, along arrows C—C of FIG. 3 showing a lock working on the bevel gear;

FIG. 5 represents the external shield of the case, seen from the inside;

FIG. 6 shows an enlarged detail of the lock acting on the set of mobile gears;

and FIGS. 7 and 8 respectively show the side and front views of a prop equipped with an electrical maneuvering motor with a key circuit breaker.

DETAILED DESCRIPTION OF THE PREFERRED EMBODIMENTS

Figure 1:
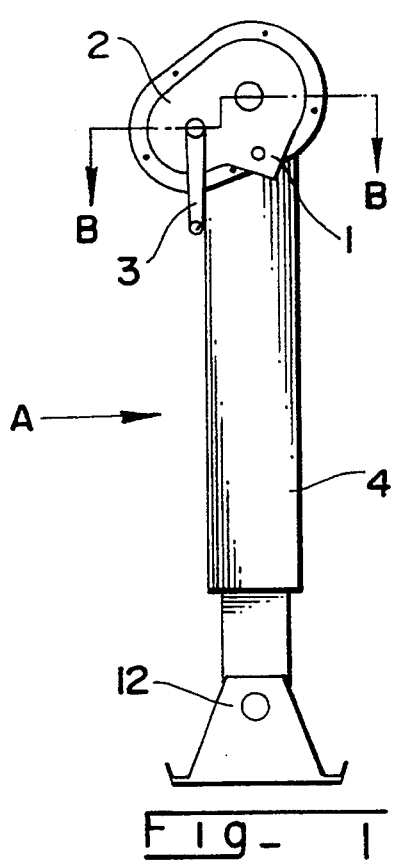
FIG. 1 represents a trailer prop seen from the front.
Figure 2:
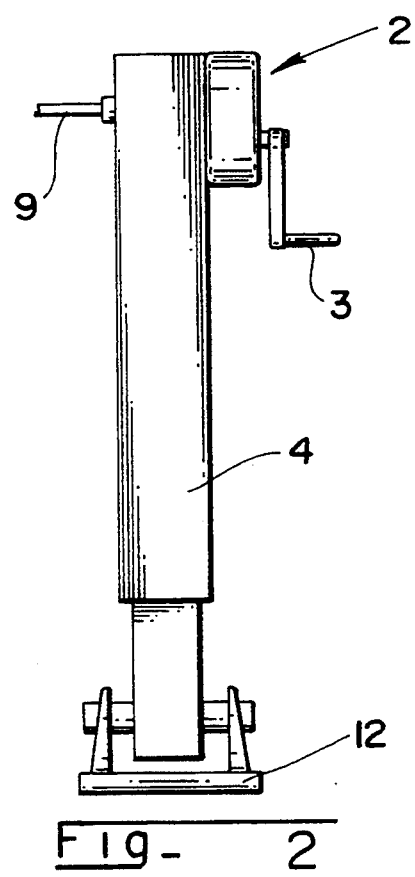
FIG. 2 is a lateral view, along arrow A of FIG. 1.
Figure 3:
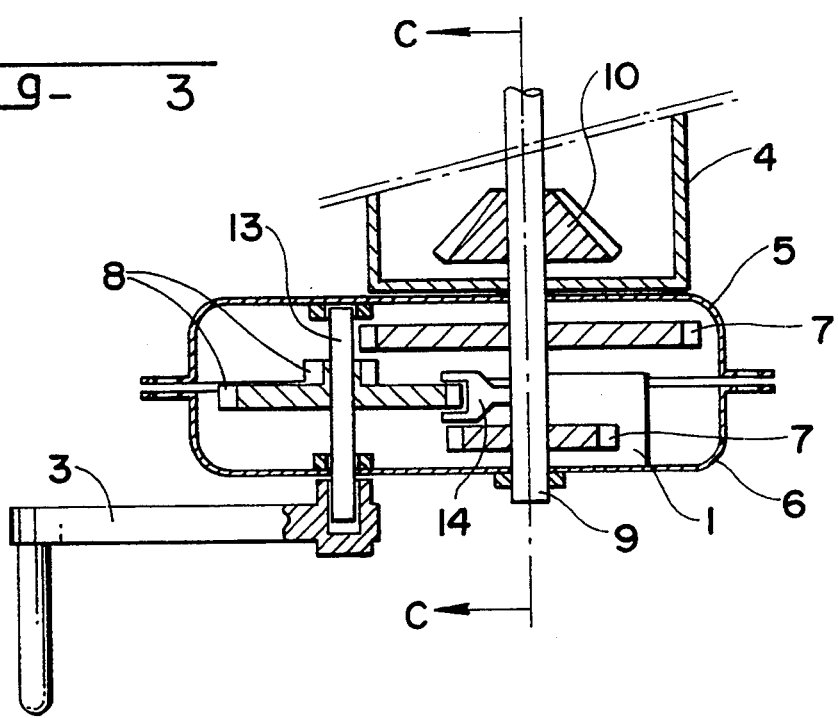
FIG. 3 is horizontal enlarged section of the case along arrows B—B of FIG. 1.

The device, FIGS. 1, 2, 3, 5 and 6 is a purely mechanical anti-theft device constituted, in its preferred version, of a lock 1 integrated into case 2 comprising the gears enabling crank 3 to actuate props 4.

Case 2 is formed of two shields assembled normally by peripheral screw bolt joints, an internal shield 5 and an external shield 6. This case houses two sets of serrated wheels, a set of two driven wheels 7 and a set of two driving wheels 8. The driven wheels are mounted on a shaft 9, common to both props bearing the conical gears 10 actuating the threaded rods 11 causing the lifting or lowering of soles 12 of props 4.

The driving wheels 8 are carried by an axially mobile shaft 13 whose position can be modified from the outside, which enables two different gear reductions or a neutral position to be triggered.

Lock 1 is mounted in a non-removable manner inside the external shield 6 of case 2 and has a catch 14 in the shape of a fork designed to immobilize the set of driving serrated wheels 8 in the neutral position by positioning itself in a straddle on the edge of the larger serrated driving wheel, which completely prevents any maneuvering of the props. The two portions of the end of catch 14 are advantageously provided with abutments 17 preventing the security device from being forced by twisting the catch 14, or by repeated blows on the end of mobile shaft 13. The length of these abutments is calculated in such a way that their end brushes either the internal wall of external shield 6 of the case, or the larger of the driven serrated wheels 7.

In order to render the system tamper-proof, the closure of case 2 is obtained by welding, riveting, crimping or any other equivalent means.

Lock 1 can be a key lock, as well as a lock with a magnetic card, a numbering or coding system.

In a first variation of the embodiment (FIG. 4), lock 1 is assembled at the upper portion of the actual prop 4, inside the upper square tube. In this case, catch 15 is designed to be able to penetrate into the teeth of the driven conical gear 16 mounted on threaded rod 11.

In a second variation of the embodiment (not represented), the catch can penetrate in a transverse hole provided in shaft 9 common to both props.

In another variation of the embodiment (not represented), the catch blocks the mechanism by penetrating into a hole of the axially mobile shaft 13 provided to receive the pin enabling crank 3 to be affixed to the shaft.

The device represented in FIGS. 7 and 8 comprises an electric motor 21, connected to the tractor by a key circuit breaker 22 and is actuated by means of a key interrupter 23 (by an identical key), which drives the lifting or lowering of prop 4. The connection between electric motor 21 and props 4 is ensured by means of gears 25 inserted in a casing 26 filled with grease and connected to the gear system of case 2. The driving of gears 25 can be disengaged by means of a handle 27 placing the system in the neutral position.

The activation of motor 21 can only be undertaken after unlocking the key circuit breaker, and after having actuated, by means of key interrupter 23 (with the same key), the lifting-lowering maneuver of the prop.

However, motor 21 can be powered without the key circuit breaker 22 or actuated without key interrupter 23 by means of a cable directly connected onto the battery of the tractor (such device thus losing its anti-theft security functions).

The driving of props 4 by the electric motor 21 can be obtained by replacing the gear system of case 2 of the prop by direct driving and connection to the lifting-lowering system of the props.

According to variations, the motor system can be connected to the prop assembly by a belt, a chain, an endless screw, a transmission, a hydraulic system, or any other drive system.

The device according to the invention is particularly adapted to the maneuvering operations of trailers of heavy weight vehicles (cisterns, freezers, platforms, etc.) and enables them to be immobilized by blocking the props with complete security.

The positioning of the various component elements provides the invention with a maximum of useful effects which have not, up until now, been obtained by similar devices.

We claim:

1. Anti-theft security device for preventing theft of an immobilized and un-coupled detachable trailer, including semi-trailers, comprising:
   parking props comprising an upper tube and a lower tube which are slidable in each other;
   an articulated sole on a lower portion of said lower tube, said sole being adapted for engagement with the ground;
   an internal screw within said lower tube;
   a bevel gear for driving said internal screw;
   a casing affixed to said parking props;
   a disengageable assembly of at least one of serrated wheels and gears housed in said casing; and
   a safety key lock cooperating with and disengaging said disengageable assembly to uncouple a motive energy source of a maneuvering mechanism of said parking props, to thereby prevent persons without a requisite safety key from lifting said parking props when the trailer is parked.

2. The device as defined by claim 1, wherein said motive energy source comprises an electrical energy source.

3. The device as defined by claim 2, wherein said electrical energy source comprises an electric motor.

4. The device as defined by claim 3, comprising a key circuit breaker associated with a tractor for disconnecting said electric motor to prevent use thereof; a key operated interrupter electrically connected to said key circuit breaker and said electric motor; and said disengageable assembly comprises gears capable of being disengaged with an operating handle into a neutral position.

5. The device as defined by claim 4, wherein said casing is filled with grease.

6. The device as defined by claim 5, comprising an identical key for said key circuit breaker and said interrupter.

7. The device as defined by claim 5, wherein said electric motor is directly connected to said casing.

8. The device as defined by claim 5, wherein said electric motor drives parking props with an hydraulic system.

9. The device as defined by claim 1, wherein said safety lock is integrated into said casing, and comprises a catch cooperating with a double set of serrated wheels housed in said casing; one set of said double set of serrated wheels is axially mobile so as to enable triggering of two different gear reductions or selection of a neutral position preventing the axially mobile serrated wheels from meshing on corresponding gears.

10. The device as defined by claim 1, wherein said casing comprises an external shield, and said safety lock is non-removably mounted inside said external shield of said casing; and said safety lock comprising a fork-shaped catch constructed and arranged to immobilize a set of driving serrated wheels in a neutral position.

11. The device as defined by claim 10, wherein said driving serrated wheels are borne by an axially mobile shaft, and said catch is capable of being positioned in a straddle on an edge of a bigger of serrated driving wheel of said set of driving serrated wheels.

12. The device as defined by claim 1, wherein said casing is tamper-proof.

13. The device as defined by claim 9, wherein said casing is tamper-proof.

14. The device as defined by claim 5 wherein said casing is welded, riveted or crimped.

15. The device as defined by claim 11, wherein said casing is tamper-proof.

16. The device as defined by claim 15, wherein said casing is welded, riveted or crimped.

17. The device as defined by claim 1, wherein said motive energy source comprises a manual energy source.

18. The device as defined by claim 17, wherein said manual energy source comprises a crank.

19. Anti-theft security device for preventing theft of an immobilized and un-coupled detachable trailer, including semi-trailers, comprising:
   parking props comprising an upper tube and a lower tube which are slidable in each other;

an articulated sole on a lower portion of said lower tube, said sole being adapted for engagement with the ground;

an internal screw within said lower tube;

a bevel gear for driving said internal screw;

a casing affixed to said parking props;

a disengageable assembly of at least one of serrated wheels and gears housed in said casing; and a safety key lock cooperating with and disengaging said disengageable assembly to uncouple a motive energy source of a maneuvering mechanism of said parking props, to thereby prevent persons without a requisite safety key from lifting said parking prods when the trailer is parked;

said safety lock integrated into said casing, and comprising a catch cooperating with a double set of serrated wheels housed in said casing; one set of said double set of serrated wheels being axially mobile so as to enable triggering of two different gear reductions or selection of a neutral position preventing the axially mobile serrated wheels from meshing on corresponding gears; and said catch comprising two end portions including abutments preventing the security device from being forced by twisting said catch, said abutments comprising a length calculated so that ends of said abutments brush either an internal wall of an external shield of said casing, or a bigger driven serrated wheel of the other set of serrated wheels.

20. Anti-theft security device for preventing theft of an immobilized and un-coupled detachable trailer, including semi-trailers, comprising:

parking props comprising an upper tube and a lower tube which are slidable in each other;

an articulated sole on a lower portion of said lower tube, said sole being adapted for engagement with the ground;

an internal screw within said lower tube;

a bevel gear for driving said internal screw;

a casing affixed to said parking props;

a disengageable assembly of at least one of serrated wheels and gears housed in said casing; and a safety key lock cooperating with and disengaging said disengageable assembly to uncouple a motive energy source of a maneuvering mechanism of said parking props, to thereby prevent persons without a requisite safety key from lifting said parking prods when the trailer is parked;

said casing comprising an external shield, and said safety lock is non-removably mounted inside said external shield of said casing; and said safety lock comprising a fork-shaped catch constructed and arranged to immobilize a set of driving serrated wheels in a neutral position;

said set of driving serrated wheels is borne by an axially mobile shaft, and said catch is capable of being positioned in a straddle on an edge of a bigger serrated driving wheel of said set of driving serrated wheels; and said catch comprising two end portions including abutments preventing the security device from being forced by twisting said catch, said abutments comprising a length calculated so that ends of said abutments brush either an internal wall of an external shield of said casing, or said bigger driven serrated wheel of a set of driven serrated wheels.

* * * * *

UNITED STATES PATENT AND TRADEMARK OFFICE
CERTIFICATE OF CORRECTION

PATENT NO. : 5,426,961
DATED : June 27, 1995
INVENTOR(S) : P. RIMBAUD et al.

It is certified that error appears in the above-indentified patent and that said Letters Patent is hereby corrected as shown below:

At column 4, line 22 (claim 6, line 1), change "5," to ---4,---.
At column 4, line 25 (claim 7, line 1), change "5," to ---4,---.
At column 4, line 27 (claim 8, line 1), change "5," to ---4,---.
At column 5, line 15 (claim 19, line 19), change "prods" to ---props---.
At column 6, line 16 (claim 20, line 19), change "prods" to ---props---.

Signed and Sealed this

Thirtieth Day of April, 1996

Attest:

BRUCE LEHMAN

Attesting Officer

Commissioner of Patents and Trademarks